United States Patent

Kennicott et al.

[15] 3,694,879
[45] Oct. 3, 1972

[54] TOOL HOLDER AND METHOD OF USING

[72] Inventors: Wilbur L. Kennicott, Ligonier; James W. Heaton, Greensburg, both of Pa.

[73] Assignee: Kennametal Inc., Latrobe, Pa.

[22] Filed: Sept. 28, 1970

[21] Appl. No.: 75,873

[52] U.S. Cl. ..................................................29/96
[51] Int. Cl. ...........................B26d 1/00, B23b 29/00
[58] Field of Search..........29/96, 97, 98, 105, 105 A; 82/30

[56] References Cited

UNITED STATES PATENTS

| | | | |
|---|---|---|---|
| 3,332,130 | 7/1967 | Armstrong | 29/105 |
| 637,495 | 11/1899 | Arnold | 29/105 |
| 3,220,089 | 11/1965 | Hammers | 29/96 |
| 3,239,911 | 3/1966 | Williams | 29/96 |
| 3,252,202 | 5/1966 | Bullard | 29/96 |
| 3,335,480 | 8/1967 | Cashman | 29/96 |
| 2,734,256 | 2/1956 | Forward | 29/96 |

FOREIGN PATENTS OR APPLICATIONS

| | | | |
|---|---|---|---|
| 872,693 | 7/1961 | Great Britain | 29/105 |

*Primary Examiner*—Harrison L. Hinson
*Attorney*—Melvin A. Crosby

[57] ABSTRACT

The specification discloses a tool holder, especially for receiving throw away inserts in which the tool holder is a bar-like member adapted for being clamped in a tool support member. The bar-like member has abutment elements thereon to abut the support member to locate the tool holder in a predetermined position. The regions for receiving the abutments are threaded for receiving threaded abutment screws and are adapted at their outer ends to receive pressed in abutment elements which can be ground to a precise dimension whereby the mounting of the tool holder in the support member will provide for precise fixed positioning of an insert mounted on the holder.

6 Claims, 5 Drawing Figures

PATENTED OCT 3 1972　3,694,879
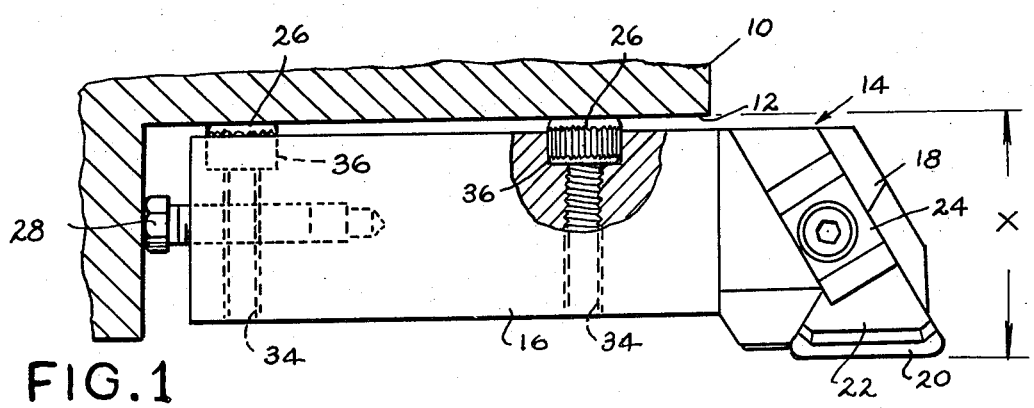
FIG.1
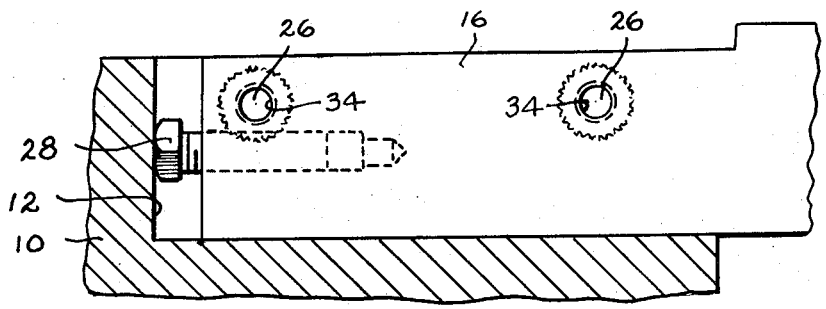
FIG. 2
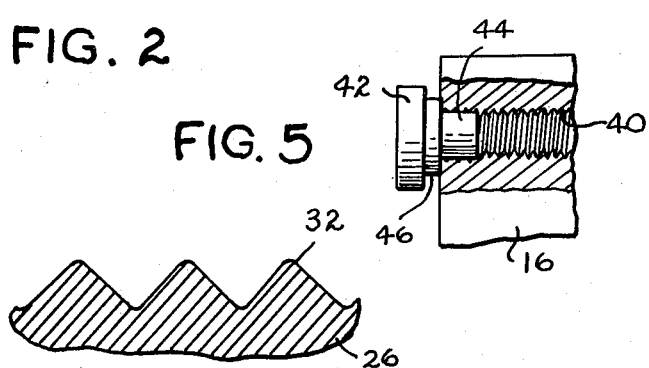
FIG. 5
FIG. 3
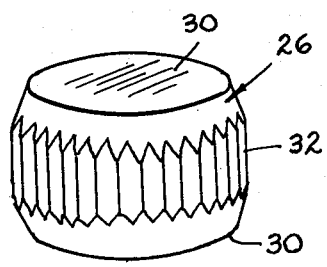
FIG. 4
INVENTOR.
WILBUR L. KENNICOTT
BY JAMES W. HEATON

TOOL HOLDER AND METHOD OF USING

The present invention relates to tool holders and to methods of making and using tool holders and is particularly concerned with tool holders of the present type, especially those adapted for receiving throw away inserts.

Tool holders are well-known in the trade and usually take the form of some sort of shank member adapted for being clamped in a support on a machine tool and having a hard cutting insert mounted thereon for engagement with the work being operated in the machine tool. The hard inserts can be cemented or brazed in place on the holder but usually are of the throw away type which are manufactured to precise dimensions.

An ever increasing number of machine tools are numerically controlled according to programs recorded on punched tape, or the like, and, in connection with such machine tools, it is desirable to be able to position an insert in a very precise position in the machine tool relative to the work so that the workpiece operated thereby will come out to exactly the desired dimensions.

Even in instances where machine tools are not numerically controlled, as, for example, with a template controlled machine tool, it is desirable for the cutting edge on the cutting insert to occupy a certain precise position in the machine tool.

Heretofore, it has been customary to provide the shanks on which such cutting inserts are mounted with abutment elements which engage accurately located surfaces in the support member in the machine tool provided to receive the holders whereby the abutment elements determine the exact position of the cutting edge of the insert. The aforementioned abutment elements are generally threaded into the shank of the tool holder and can be adjusted therein by means of a suitable fixture before the shank is mounted in the support member so that the operation of changing tools can be quickly carried out by the tool operator.

In certain instances, as, for example, for numerically controlled machine tools, the degree of precision required for the cutting edge of the insert is such that the surfaces of the shank of the tool holder are ground relative to the cutting edge of the insert. The ground area on the holder is engaged with a ground area on the support provided for the holder in the machine tool and the holder is then firmly clamped. The procedure eliminates all possibility of error or improper setting of adjustable abutment elements, but does not allow for variations from insert to insert and is not, therefore, always accurate enough.

Heretofore, the holders having fixed ground abutment areas thereon were an individual type of holder and those having adjustable abutment elements therein were a different type thus requiring that both tool manufacturers and users maintain an inventory of both types of holders and substantially preventing the use of either type holder in circumstances dictating the use of the other type holder.

With the foregoing in mind, a primary objective of the present invention is the provision of a holder for a cutting insert so constructed and arranged that it can be employed either with adjustable abutment elements, or areas, or with fixed ground abutment elements, or areas.

A still further object is the provision of a holder of the nature referred to which can readily be converted from one type to the other.

Still another object of this invention is the provision of a method of constructing and using tool holders of the nature referred to which permits the advantages of both type of holders identified above to be realized in one and the same holder.

These and other objects and advantages of the present invention will become more apparent upon reference to the following detailed specification taken in connection with the accompanying drawings in which:

FIG. 1 is a plan view showing a holder according to the present invention mounted in a pocket in a support member therefor;

FIG. 2 is a view looking in at the side of the tool holder;

FIG. 3 is a fragmentary sectional view showing a typical knurling pattern employed on a plug forming a part of the present invention and adapted to be pressed into a holder;

FIG. 4 is a perspective view showing the knurled plug; and

FIG. 5 is a fragmentary view showing another manner in which a pressed in plug could be provided for a holder according to the present invention.

Referring to the drawings somewhat more in detail, in FIG. 1, 10 represents a tool support member of a machine tool having a pocket 12 for receiving a tool holder generally indicated at 14. Tool holder 14 comprises a shank portion 16 within pocket 12 and a projecting portion 18 having a pocket in which a cutting insert 20 is detachably mounted as by being clamped in place in the holder pocket by a chip breaker 22 and a hold down clamp 24.

The shank portion 16 of the tool holder is clamped in place in the pocket by any suitable clamping means and comprises abutment elements 26 in spaced relation along one side of the tool holder and abutment element 28 at the back end of the tool holder. The abutment elements engage accurately located surfaces in pocket 12 and thereby precisely determine the position of the cutting edge of insert 20. Each abutment element 26 is in the form of a knurled plug which will be seen in perspective in FIG. 4.

It is advantageous to form the plugs somewhat to a barrel shape with flat ends 30 and with the knurling 32 extending around the central portion of the plug. Knurling 32 may advantageously be of the type illustrated in FIG. 3 wherein it will be seen that the knurling is formed with 90° peaks and valleys.

Axially aligned with abutment elements 26 in the shank portion 16 of the holder are threaded bores 34 having counter bores at one end, indicated at 36. The threaded bores 34 and the counterbores 36 are adapted for receiving adjustable abutment elements according to well known practices. What the present invention provides is the knurled plugs forming fixed abutment elements 26 which can be pressed into the counterbores 36 so as to be fixedly held therein and which can be ground at their outer ends to provide for exactly the proper dimension X from the cutting edge of insert 20 to the wall of pocket 12 which the outer ends of the knurled plugs, or abutment elements, engage.

Should it be desired, by the maker, or user, of the tool holder, to provide for adjustable abutment elements, the knurled plugs can easily be removed by running screws through the bores 34 from the ends opposite the knurled plugs and forcing the knurled plugs out. Thereafter, conventional threaded abutment screws can be threaded into bores 34 with the heads of the screws at the counterbored ends of the bores and a conventional adjustable abutment tool holder of the type illustrated will be provided.

Similarly, a tool holder of the type illustrated having adjustable abutment screws in bores 34 can be converted to a tool holder having a precise fixed X dimensions by removing the screws from bores 34, pressing knurled plugs into the counter bores 36, and then grinding the knurled plugs to the proper dimension.

It will be evident that the arrangement of the present invention is not only of substantial benefit to the manufacturer of the holders, but it is also of substantial benefit to the manufacturer of the machine tools and to the users of the holders by substantially reducing inventories required, while permitting the holders readily to be converted from the type in which the X dimension is adjustable to the type in which the X dimension is fixed.

The adjustable abutment screw 28 is usually retained but it is also possible for this screw to be replaced by a fixed abutment element. Such an arrangement is illustrated in FIG. 5 which shows the extreme left end of the shank portion 16 of a tool holder. The shank portion 16 is provided with the threaded axial bore 40 adapted for receiving the adjustable abutment screw 28 which, in FIG. 5, is replaced by a pressed-in abutment element 42 which has an end part 44 of a size to be press fitted into the threads of bore 40 while having a step 46 formed on the shank side of head 42. When abutment element 42 is pressed in place, it can then be ground to a precise dimension and thereby precisely determine the dimension from the back end of pocket 12 to the outer tip of the cutting insert.

The step 46 permits the introduction of a prying tool under the head of the abutment element 42 so that it can be pried out of threaded bore 40. The fit of portion 44 in threaded bore 40 is such that, while the threads of the bore are deformed to the extent necessary to grip the abutment element when it is pressed into bore 40, after the abutment element is pried out of the bore, a screw can still be forced into the bore.

Alternatively, the threads of bore 40 deformed by the pressed in abutment element can be cleaned up with a tap. Still further, the bore 40 could be provided with a counterbored outer end and the abutment element 42 provided with a knurled portion pressed into the counterbore in the same manner as the abutment elements 26 are pressed into the counterbores 36.

As in the case with the abutment elements 26, the abutment element at the back end of the holder can either be of the adjustable type or a fixed ground type whereby the holders can be readily converted from the adjustable type to the fixed type.

What is claimed is:

1. In a tool holder; a shank having means to support a cutting element at one end, said shank being receivable in a support and being adapted for being fixedly clamped to the support, said support having at least two angularly related walls which respectively face one side of said shank and the end of said shank opposite the said one end thereof, bores in said shank to receive abutment elements which protrude from said bores for engagement with said walls of said support to locate said tool holder relative to the support, said bores having at least a portion of the length thereof threaded, and abutment elements receivable in said bores and including screw threaded first abutment elements adapted for adjustable threaded engagement with the threaded portions of said bores and second abutment elements adapted for being press fitted in said bores, said bores being distributed along the length of said one side of said shank and the said end of the shank opposite said one end thereof, said shank and each of said second abutment elements comprising cooperating elements of interengaging abutment means for fixedly locating said second abutment elements relative to the said shank when press fitted in the respective said bores.

2. A tool holder according to claim 1 in which at least some of said bores are provided with counterbored ends in which the respective second abutment elements are pressed, and the shoulders at the bottom of the counterbores in said bores and the inner ends of said second abutment elements forming said cooperating elements of interengaging abutment means.

3. A tool holder according to claim 1 in which at least one of said bores is threaded completely to the end thereof in which the respective second abutment element is mounted and the pertaining said second abutment element is adapted for being pressed into the bore while deforming the threads in the bore and includes a shoulder facing said shank and engageable with the side of said shank adjacent the respective bore to locate the said second abutment element on the shank, said shoulder and said side of the shank adjacent said bore forming said cooperating elements of interengaging abutment means.

4. A tool holder according to claim 2 in which at least the said second abutment elements in said counterbored ends of said bores are in the form of cylindrical button members having knurled peripheries.

5. A tool holder according to claim 3 in which the said second abutment element includes a further shoulder spaced axially outwardly from the first mentioned shoulder for engagement by a prying tool to remove the abutment element from the bore.

6. A tool holder according to claim 1 in which said shank is bar-like and at least two of said bores are disposed in spaced relation along said one side of said shank and extend completely through the shank in the lateral direction thereof.

* * * * *